United States Patent
Qin et al.

(10) Patent No.: US 12,346,627 B2
(45) Date of Patent: Jul. 1, 2025

(54) PICTURE DISPLAY METHOD AND APPARATUS, AND DEVICE AND MEDIUM

(71) Applicant: BOE Technology Group Co., Ltd., Beijing (CN)

(72) Inventors: Ruifeng Qin, Beijing (CN); Lili Chen, Beijing (CN); Yanqiu Zhao, Beijing (CN); Peng Han, Beijing (CN); Hao Zhang, Beijing (CN); Huidong He, Beijing (CN); Qianwen Jiang, Beijing (CN); Weihua Du, Beijing (CN); Juanjuan Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/703,705

(22) PCT Filed: Jul. 6, 2023

(86) PCT No.: PCT/CN2023/105985
§ 371 (c)(1),
(2) Date: Apr. 22, 2024

(87) PCT Pub. No.: WO2024/022070
PCT Pub. Date: Feb. 1, 2024

(65) Prior Publication Data
US 2024/0427547 A1 Dec. 26, 2024

(30) Foreign Application Priority Data
Jul. 26, 2022 (CN) .......................... 202210885790.0

(51) Int. Cl.
*G06F 3/14* (2006.01)
*G06T 19/20* (2011.01)

(52) U.S. Cl.
CPC ............ *G06F 3/1454* (2013.01); *G06T 19/20* (2013.01)

(58) Field of Classification Search
CPC ....... G06F 3/1454; G06F 16/00; G06T 19/20; G02B 27/017
See application file for complete search history.

(56) References Cited

FOREIGN PATENT DOCUMENTS

| CN | 109997063 A | 7/2019 |
|---|---|---|
| CN | 111127633 A | 5/2020 |

(Continued)

OTHER PUBLICATIONS

PCT/CN2023/105985 international search report dated Nov. 3, 2023.
PCT/CN2023/105985 Written Opinion dated Nov. 3, 2023.

*Primary Examiner* — Abhishek Sarma
(74) *Attorney, Agent, or Firm* — IPro, PLLC

(57) ABSTRACT

The present invention relates to a picture display method. In the present invention, a target database for storing at least one candidate three-dimensional model and a feature matrix corresponding to each candidate three-dimensional model is created, wherein the candidate three-dimensional model is obtained on the basis of performing incomplete-part completion and/or color restoration on an initial three-dimensional model obtained by means of scanning by a picture scanning device. Therefore, after a picture including a target object is collected and a target feature matrix of the target object is determined on the basis of the picture including the target object, a target three-dimensional model, which matches the target object and has been subjected to incomplete part completion and/or color restoration, can be acquired from the target database on the basis of the target feature matrix of the target object, so as to display the target three-dimensional model.

16 Claims, 6 Drawing Sheets

(56) References Cited

FOREIGN PATENT DOCUMENTS

| | | |
|---|---|---|
| CN | 111414225 A | 7/2020 |
| CN | 111681320 A | 9/2020 |
| CN | 111784846 A | 10/2020 |
| CN | 111936912 A | 11/2020 |
| CN | 113762059 A | 12/2021 |
| CN | 115237363 A | 10/2022 |

PICTURE DISPLAY METHOD AND APPARATUS, AND DEVICE AND MEDIUM

CROSS-REFERENCE TO RELATED APPLICATION

This application is a national stage of International Application No. PCT/CN2023/105985, filed on Jul. 6, 2023, which claims priority to Chinese Patent Application No. 202210885790.0, filed on Jul. 26, 2022. Both of the aforementioned applications are hereby incorporated by reference in their entireties.

TECHNICAL FIELD

The present disclosure relates to the field of computer technologies, and in particular, to a picture display method and apparatus, and a device and a medium.

BACKGROUND

With continuous development of economy, travel has gradually become an important leisure and entertainment manner. As an important component in the world of stone-carving art, grotto-type historical relics gradually become a main tour choice for people when traveling.

However, volumes of the grotto-type historical relics are generally huge, and in order to protect the relics, tourists are generally not allowed to watch closely, so as to avoid human damage to the grotto-type historical relics. Therefore, the tourists cannot enjoy whole appearance of the grotto-type historical relics during sightseeing, and cannot feel magnificence and brilliance of the grotto-type historical relics. Therefore, there is a need for a picture display method to help tourists better enjoy a sight of the grotto-type historical relics.

SUMMARY

The present disclosure provides a picture display method and apparatus, a device and a medium, so as to solve deficiencies in related technologies.

According to a first aspect of embodiments of the present disclosure, a picture display method is provided, performed by a first head-mounted device, where the method includes:
  collecting a picture including a target object;
  determining a target feature matrix of the target object based on the picture including the target object;
  acquiring a target three-dimensional model matched with the target object from a target database based on the target feature matrix of the target object, where the target database is used to store at least one candidate three-dimensional model and a feature matrix corresponding to each of the at least one candidate three-dimensional model, and each of the at least one candidate three-dimensional model is obtained by performing at least one of incomplete-part completion or color restoration based on an initial three-dimensional model obtained by scanning using a picture-scanning device; and
  displaying the target three-dimensional model.

In some embodiments, acquiring the target three-dimensional model matched with the target object from the target database based on the target feature matrix of the target object includes:
  matching the target feature matrix with the feature matrix stored in the target database; and
  determining a candidate three-dimensional model corresponding to the feature matrix matched with the target feature matrix as the target three-dimensional model.

In some embodiments, a process of constructing the target database includes:
  acquiring the initial three-dimensional model obtained by scanning using the picture-scanning device;
  acquiring a candidate three-dimensional model obtained by performing at least one of incomplete-part completion or color restoration based on the initial three-dimensional model;
  extracting a feature matrix of the candidate three-dimensional model in different viewing angles; and
  storing the candidate three-dimensional model and the extracted feature matrix in the target database.

In some embodiments, the target database is further configured to store media data corresponding to the at least one candidate three-dimensional model, and the media data is used to introduce the candidate three-dimensional model in a form of video or audio;
  after displaying the target three-dimensional model, the method further includes:
  displaying first prompt information, where the first prompt information is used to query whether to play media data corresponding to the target three-dimensional model.

In some embodiments, after displaying the first prompt information, the method further includes:
  in response to receiving first feedback information based on the first prompt information, acquiring the media data corresponding to the target three-dimensional model from the target database, where the first feedback information is used to indicate to play the media data corresponding to the target three-dimensional model; and
  playing the acquired media data.

In some embodiments, after displaying the target three-dimensional model, the method further includes:
  in response to a picture-adjusting operation on the first head-mounted device, adjusting a picture of the displayed target three-dimensional model according to at least one of a display viewing angle or a picture zooming factor indicated by the picture-adjusting operation.

In some embodiments, in response to the picture-adjusting operation on the first head-mounted device, adjusting the picture of the displayed target three-dimensional model according to at least one of the display viewing angle or the picture zooming factor indicated by the picture-adjusting operation includes at least one of:
  in response to the picture-adjusting operation at a first preset position on the first head-mounted device, displaying a picture of the target three-dimensional model at a display viewing angle indicated by the picture-adjusting operation according to the display viewing angle indicated by the picture-adjusting operation; or
  in response to the picture-adjusting operation at a second preset position on the first head-mounted device, zooming in or zooming out the picture of the displayed target three-dimensional model according to the picture zooming factor indicated by the picture-adjusting operation.

In some embodiments, the method further includes:
  in response to the picture-adjusting operation at the second preset position on the first head-mounted device, when the picture zooming factor indicated by the picture-adjusting operation reaches a set zooming factor, displaying second prompt information, where the second prompt information is used to indicate that the picture zooming factor indicated by the picture-adjusting operation reaches the set zooming factor.

In some embodiments, the method further includes:

in response to the picture-adjusting operation on the first head-mounted device, setting a transmittance adjustable film of the first head-mounted device to an opaque state; or in response to the picture-adjusting operation on the first head-mounted device, acquiring ambient light brightness, and adjusting transparency level of the transmittance adjustable film of the first head-mounted device based on the ambient light brightness.

In some embodiments, the method further includes:

when the first head-mounted device is paired with a second head-mounted device, sending a displayed picture of the first head-mounted device to the second head-mounted device.

In some embodiments, the method further includes:

when the first head-mounted device is paired with a second head-mounted device, in response to a location-acquiring operation on the first head-mounted device, acquiring location information of the second head-mounted device; and displaying the acquired location information.

In some embodiments, the method further includes:

displaying a first route map, where the first route map is used to indicate a route from a location of the first head-mounted device to a location of the second head-mounted device.

In some embodiments, the method further includes:

setting a meeting time and a meeting location through the first head-mounted device;

the method further includes:

when the first head-mounted device is paired with a second head-mounted device, in response to reaching the meeting time, sending meeting information to the second head-mounted device, where the second head-mounted device is used to display a second route map when receiving the meeting information, where the second route map is used to indicate a route from a location of the second head-mounted device to the meeting location.

In some embodiments, the target object is a grotto-statue-type historical relic.

According to a second aspect of embodiments of the present disclosure, a picture display apparatus is provided, applied to a first head-mounted device, where the apparatus includes:

a collecting module, configured to collect a picture including a target object;

a determining module, configured to determine a target feature matrix of the target object based on the picture including the target object;

an acquiring module, configured to acquire a target three-dimensional model matched with the target object from a target database based on the target feature matrix of the target object, where the target database is used to store at least one candidate three-dimensional model and a feature matrix corresponding to each of the at least one candidate three-dimensional model, and each of the at least one candidate three-dimensional model is obtained by performing at least one of incomplete-part completion or color restoration based on an initial three-dimensional model obtained by scanning using a picture-scanning device; and a display module, configured to display the target three-dimensional model.

In some embodiments, when acquiring the target three-dimensional model matched with the target object from the target database based on the target feature matrix of the target object, the acquiring module is configured to:

match the target feature matrix with the feature matrix stored in the target database; and determine a candidate three-dimensional model corresponding to the feature matrix matched with the target feature matrix as the target three-dimensional model.

In some embodiments, a process of constructing the target database includes:

acquiring the initial three-dimensional model obtained by scanning using the picture-scanning device;

acquiring a candidate three-dimensional model obtained by performing at least one of incomplete-part completion or color restoration based on the initial three-dimensional model;

extracting a feature matrix of the candidate three-dimensional model in different viewing angles; and storing the candidate three-dimensional model and the extracted feature matrix in the target database.

In some embodiments, the target database is further configured to store media data corresponding to the at least one candidate three-dimensional model, and the media data is used to introduce the candidate three-dimensional model in a form of video or audio;

the displaying module is further configured to display first prompt information, where the first prompt information is used to query whether to play media data corresponding to the target three-dimensional model.

In some embodiments, the acquiring module is further configured to: in response to receiving first feedback information based on the first prompt information, acquire the media data corresponding to the target three-dimensional model from the target database, where the first feedback information is used to indicate to play the media data corresponding to the target three-dimensional model; and the apparatus further includes:

a playing module, configured to play the acquired media data.

In some embodiments, the apparatus further includes:

an acquiring module, configured to: in response to a picture-adjusting operation on the first head-mounted device, adjust a picture of the displayed target three-dimensional model according to at least one of a display viewing angle or a picture zooming factor indicated by the picture-adjusting operation.

In some embodiments, when in response to the picture-adjusting operation on the first head-mounted device, adjusting the picture of the displayed target three-dimensional model according to at least one of the display viewing angle or the picture zooming factor indicated by the picture-adjusting operation, the adjusting module is configured to perform at least one of:

in response to the picture-adjusting operation at a first preset position on the first head-mounted device, displaying a picture of the target three-dimensional model at a display viewing angle indicated by the picture-adjusting operation according to the display viewing angle indicated by the picture-adjusting operation; or in response to the picture-adjusting operation at a second preset position on the first head-mounted device, zooming in or zooming out the picture of the displayed target three-dimensional model according to the picture zooming factor indicated by the picture-adjusting operation.

In some embodiments, the displaying module is further configured to: in response to the picture-adjusting operation at the second preset position on the first head-mounted device, when the picture zooming factor indicated by the picture-adjusting operation reaches a set zooming factor, display second prompt information, where the second prompt information is used to indicate that the picture zooming factor indicated by the picture-adjusting operation reaches the set zooming factor.

In some embodiments, the adjusting module is further configured to: in response to the picture-adjusting operation on the first head-mounted device, set transmittance adjustable film of the first head-mounted device to an opaque state; or the adjusting module is further configured to: in response to the picture-adjusting operation on the first head-mounted device, acquire ambient light brightness, and adjust transparency level of the transmittance adjustable film of the first head-mounted device based on the ambient light brightness.

In some embodiments, the apparatus further includes:
a first sending module, configured to: when the first head-mounted device is paired with a second head-mounted device, send a displayed picture of the first head-mounted device to the second head-mounted device.

In some embodiments, the acquiring module is further configured to: when the first head-mounted device is paired with a second head-mounted device, in response to a location-acquiring operation on the first head-mounted device, acquire location information of the second head-mounted device; and the displaying module is further configured to display the acquired location information.

In some embodiments, the display module is further configured to display a first route map, where the first route map is used to indicate a route from a location of the first head-mounted device to a location of the second head-mounted device.

In some embodiments, the apparatus further includes:
a setting module, configured to set a meeting time and a meeting location through the first head-mounted device;
a second sending module, configured to: when the first head-mounted device is paired with a second head-mounted device, in response to reaching the meeting time, send meeting information to the second head-mounted device, where the second head-mounted device is used to display a second route map when receiving the meeting information, where the second route map is used to indicate a route from a location of the second head-mounted device to the meeting location.

In some embodiments, the target object is a grotto-statue-type historical relic.

According to a third aspect of embodiments of the present disclosure, a head-mounted device is provided, where the head-mounted device includes a memory, a processor and a computer program stored on the memory and executable by the processor, when the processor executes the computer program, operations performed in the picture display method provided by the above-mentioned first aspect or any embodiment of the first embodiment are implemented.

According to a fourth aspect of embodiments of the present disclosure, a computer-readable storage medium is provided, where the computer-readable storage medium stores a program, and when a processor executes the program, operations performed in the picture display method provided by the above-mentioned first aspect or any embodiment of the first embodiment are implemented.

According to a fifth aspect of embodiments of the present disclosure, a computer program product is provided, where the computer program product includes a computer program, and when a processor executes the computer program, operations performed in the picture display method provided by the above-mentioned first aspect or any embodiment of the first embodiment are implemented.

In the present disclosure, a target database for storing at least one candidate three-dimensional model and a feature matrix corresponding to each candidate three-dimensional model is created, where the candidate three-dimensional model is obtained on the basis of performing incomplete-part completion and/or color restoration on an initial three-dimensional model obtained by means of scanning by a picture scanning device. Therefore, after a picture including a target object is collected and a target feature matrix of the target object is determined on the basis of the picture including the target object, a target three-dimensional model, which matches the target object and has been subjected to incomplete-part completion and/or color restoration, can be acquired from the target database on the basis of the target feature matrix of the target object, so as to display the target three-dimensional model. Therefore, the display effect of a first head-mounted device can be improved, thereby improving the user experience.

It should be understood that the above general description and the following detailed description are exemplary and illustrative only and are not intended to limit the present disclosure.

BRIEF DESCRIPTION OF DRAWINGS

The drawings herein are incorporated in and constitute a part of this specification, illustrating embodiments consistent with the present disclosure, and together with the description serve to explain the principles of the present disclosure.

DETAILED DESCRIPTION

Exemplary embodiments will be described in detail herein, examples of which are illustrated in the accompanying drawings. The following description relates to the accompanying drawings, in which like numerals indicate like or similar elements unless otherwise indicated. The embodiments described in the following exemplary embodiments do not represent all embodiments consistent with the present disclosure. Rather, they are merely examples of apparatuses and methods consistent with some aspects of the present disclosure as specifically described in the appended claims.

The present disclosure provides a picture display method, which is used for realizing three-dimensional model recovery and color restoration of a target object based on an augmented reality technology, so that a user can see the target object in an undamaged state, so that the user experience can be improved.

Optionally, the target object may be a grotto-statue-type historical relic, that is, according to the picture display method provided by the present disclosure, a three-dimensional model of a statue can be performed with incomplete-part completion and color restoration, so that a user can see the statue in an original appearance, and enjoy real magnificence and brilliance of the statue.

The picture display method may be performed by a head-mounted device, and the head-mounted device may be intelligent glasses, augmented reality (AR) glasses, etc., and a device type and a device number of the head-mounted device are not limited in the present disclosure.

After the application scenario of the present disclosure is introduced, an implementation environment of the picture display method provided by the present disclosure is described below.

Figure 1:
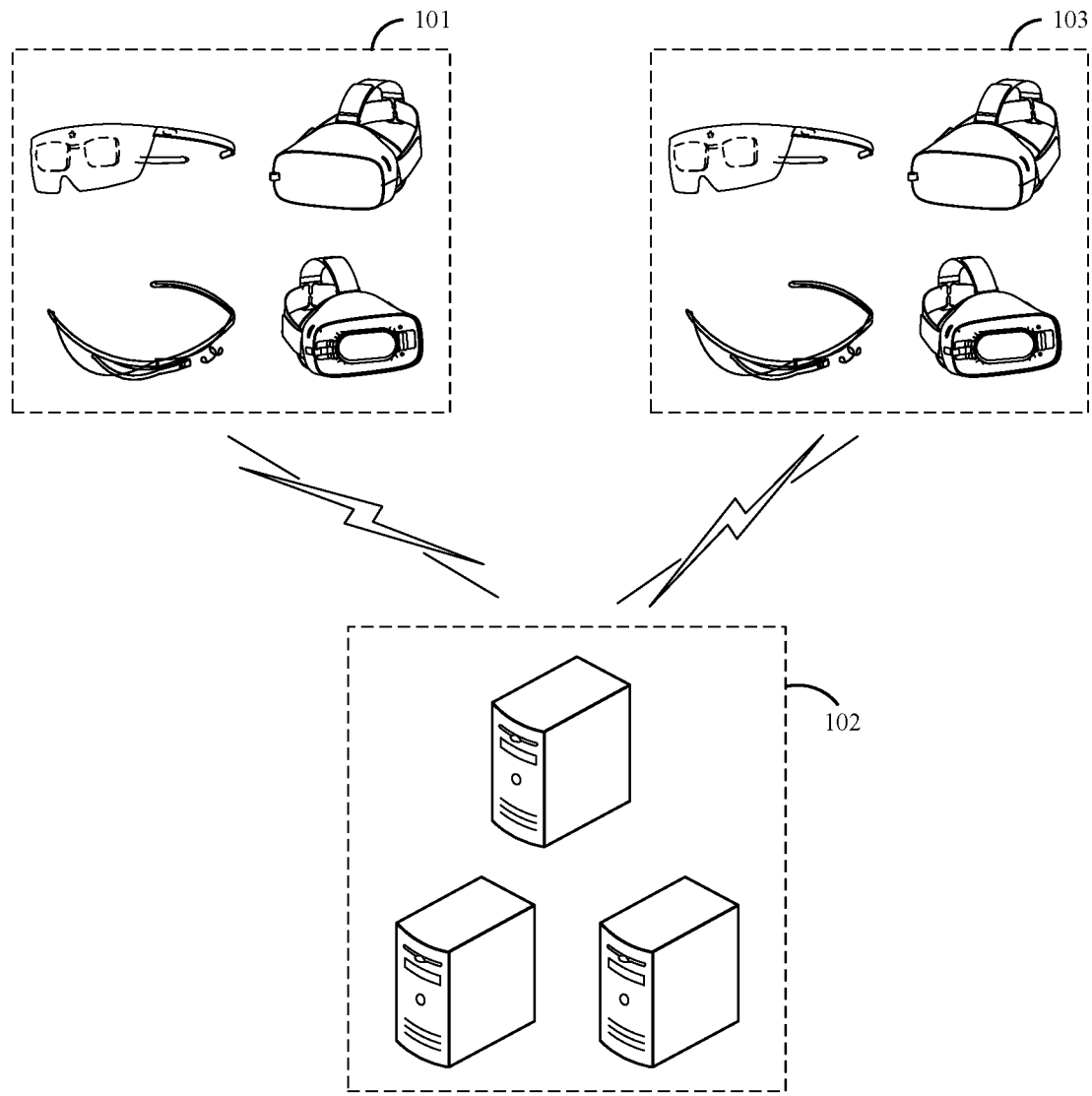
FIG. 1 is a schematic implementation environment diagram of a picture display method according to an embodiment of the present disclosure.

Referring to FIG. 1, FIG. 1 is a schematic implementation environment diagram of a picture display method according to an embodiment of the present disclosure. As shown in FIG. 1, the implementation environment may include a head-mounted device 101 and a server 102.

The head-mounted device 101 may be smart glasses, AR glasses, etc., and the server 102 may be one server, a plurality of servers, a server cluster, a cloud computing platform, etc. The head-mounted device 101 may communicate with the server 102 in a wired or wireless communication manner, so that the head-mounted device 101 may implement displaying of a target three-dimensional model of a target object after being performed with incomplete-part completion and color restoration through the picture display method provided by the present disclosure.

Optionally, the picture display method provided in the present disclosure may also be applied to other implementation environments, for example, the implementation environment may include head-mounted devices 101, and the head-mounted devices 101 may communicate to each other in a wired or wireless communication manner to implement the picture display method provided by the present disclosure.

After the implementation environment of the present disclosure is introduced, the following describes a technical solution of a picture display method provided by the present disclosure.

Figure 2:
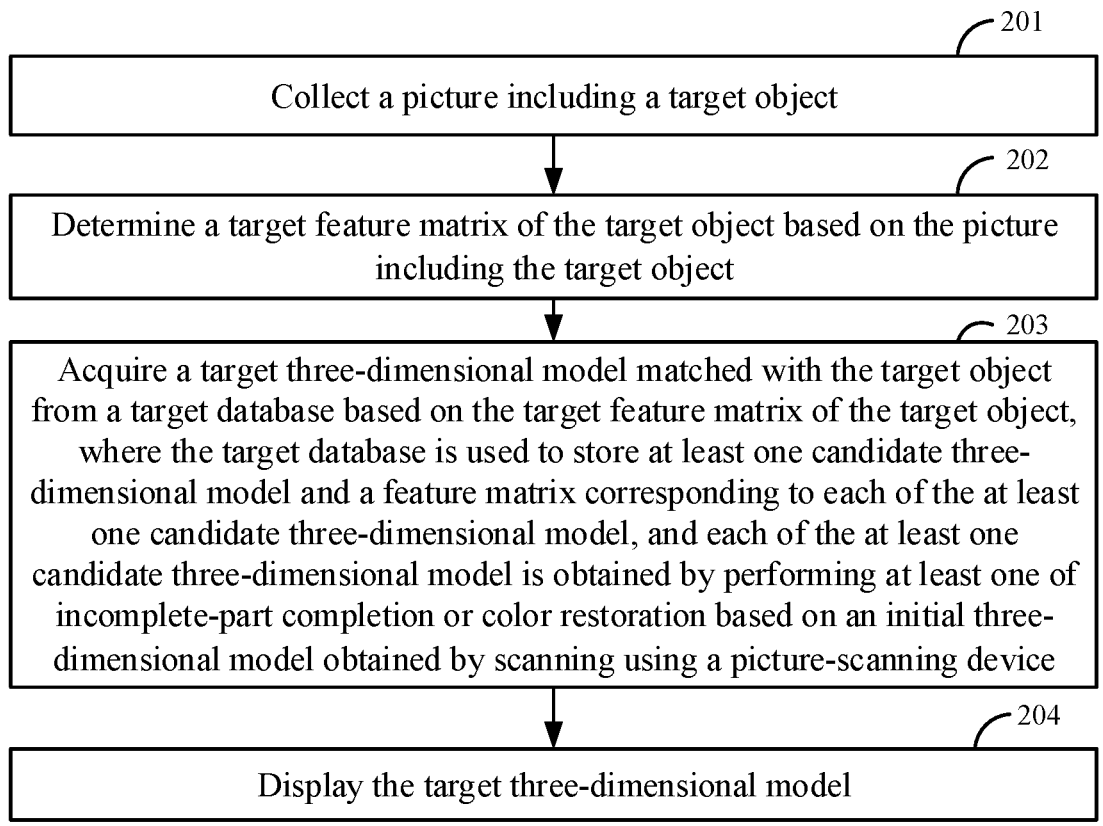
FIG. 2 is a flowchart of a picture display method according to an embodiment of the present disclosure.

Referring to FIG. 2, FIG. 2 is a flowchart of a picture display method according to an embodiment of the present disclosure, as shown in FIG. 2, the method is performed by a first head-mounted device, where the first head-mounted device may be any of a plurality of head-mounted devices, for example, the first head-mounted device may be a head-mounted device used by a parent, or the first head-mounted device may be a head-mounted device used by a child, or the first head-mounted device may be a head-mounted device used by a tour guide, or the first head-mounted device may be a head-mounted device used by a tourist, and the like, which is not limited in the present disclosure. The picture display method may include:

Step 201, collecting a picture including a target object.

The target object may be any object, for example, the target object may be a grotto-statue-type historical relic, such as a statue, optionally, the target object may also be other objects, and a specific type of the target object is not limited in the present disclosure.

It should be noted that the first head-mounted device may be internally connected or externally provided with a camera device, and a manner of setting the camera device is not limited in the present disclosure. It is taken as an example that the first head-mounted device is smart glasses, and a glass-frame of the first head-mounted device may be provided with a camera (that is, the camera device).

In a possible implementation, the first head-mounted device may collect a picture including the target object through a camera device that is internally or externally connected to the first head-mounted device.

Step 202, determining a target feature matrix of the target object based on the picture including the target object.

Step 203, acquiring a target three-dimensional model matched with the target object from a target database based on the target feature matrix of the target object, where the target database is used to store at least one candidate three-dimensional model and a feature matrix corresponding to each of the at least one candidate three-dimensional model, and each of the at least one candidate three-dimensional model is obtained by performing at least one of incomplete-part completion or color restoration based on an initial three-dimensional model obtained by scanning using a picture-scanning device.

Step 204, displaying the target three-dimensional model.

It should be noted that the first head-mounted device may be provided with a display device, so that the first head-mounted device may display the target three-dimensional model through the display device.

In the present disclosure, a target database for storing at least one candidate three-dimensional model and a feature matrix corresponding to each candidate three-dimensional model is created, where the candidate three-dimensional model is obtained on the basis of performing incomplete-part completion and/or color restoration on an initial three-dimensional model obtained by means of scanning by a picture scanning device. Therefore, after a picture including a target object is collected and a target feature matrix of the target object is determined on the basis of the picture including the target object, a target three-dimensional model, which matches the target object and has been subjected to incomplete-part completion and/or color restoration, can be acquired from the target database on the basis of the target feature matrix of the target object, so as to display the target three-dimensional model. Therefore, the display effect of a first head-mounted device can be improved, thereby improving the user experience.

The basic implementation process of the present disclosure is described above, and then various alternative embodiments of the present disclosure will be described below.

In some embodiments, for step 202, determining the target feature matrix of the target object based on the picture including the target object may be implemented by:

inputting the picture including the target object into a feature extraction model, and processing the input picture through the feature extraction model to obtain the target feature matrix of the target object.

The feature extraction model may be a plurality of types of neural network models, for example, the feature extraction model may be a convolutional neural network (CNN). Optionally, the feature extraction model may alternatively be another type of model, and a specific type of the feature extraction model is not limited in the present disclosure.

Taking the feature extraction model being an CNN as an example, the feature extraction model may include a convolution layer and a pooling layer, when acquiring the target feature matrix of the target object by using the feature extraction model, convolution processing may be performed on the input picture through the convolution layer to obtain a convolution feature of the picture, and then the pooling layer is used to perform pooling processing on the convolution feature to obtain the target feature matrix of the target object.

The above is merely an exemplary manner of obtaining the target feature matrix of the target object, and in more possible implementations, other manners may also be used to obtain the target feature matrix, which is not limited in the present disclosure.

In the above-described process, it is taken as an example that after obtaining the picture including the target object, the target feature matrix is directly determined based on the obtained picture, and the obtained picture in step 201 is located in a camera coordinate system, but generally, processing needs to be performed based on the picture located in a human-eye coordinate system, so that before the target feature matrix of the target object is determined based on the picture including the target object, the picture may be converted from the camera coordinate system to the human-eye coordinate system to ensure accuracy of the subsequently extracted target feature matrix.

Optionally, when the picture is converted from the camera coordinate system to the human-eye coordinate system, the picture may be rotated and/or translated to realize the conversion of the picture from the camera coordinate system to the human-eye coordinate system.

When the picture is rotated and/or translated, the picture may be rotated according to a set angle, and the picture may be translated according to a set displacement.

It should be noted that the set angle and the set displacement may be predetermined. For example, the set angle and the set displacement may be obtained in the following manner.

When the user wears the head-mounted device for the first time, at the same time when the user sees an actual picture through the head-mounted device, the user may also see a screen picture displayed on the display device of the head-mounted device, and the user may adjust (e.g., rotate, translate, etc.) the screen picture on the display device through controls on the head-mounted device, so that the screen picture may overlap with the actual picture, and at this time, the head-mounted device may obtain a rotated angle and/or a moved displacement of the screen picture from a start position to a position overlapping with the actual picture, so that the obtained angle is used as the set angle, and the obtained displacement is used as the set displacement to obtain the set angle and the set displacement.

The controls involved in the above process may be various forms such as keys, knobs, touch buttons, etc., and the specific types of the controls are not limited in the present disclosure.

After obtaining the target feature matrix of the target object through the above process, the target three-dimensional model corresponding to the target object may be obtained from the target database based on the obtained target feature matrix.

The target database may be a database associated with the head-mounted device, and the target database may be pre-constructed, for example, the target database may be pre-created by a related technician through a computer device or a head-mounted device. The target database may store at least one candidate three-dimensional model and a feature matrix corresponding to each candidate three-dimensional model, and a constructing process of the target database will be described below.

In some embodiments, the process of constructing the target database may include:

step 1, acquiring the initial three-dimensional model obtained by scanning using the picture-scanning device.

The picture-scanning device may be a three-dimensional scanner, an unmanned aerial vehicle, or the like, and a device type of the picture scanning device is not limited in the present disclosure.

In a possible implementation, in order to ensure that the picture-scanning device can acquire a complete picture of the target object, the three-dimensional scanner and the unmanned aerial vehicle may be used as the picture-scanning device, so that point cloud data of a lower part of the target object may be obtained by using the three-dimensional scanner as the picture-scanning device, and a picture of a higher part of the target object may be obtained by using the unmanned aerial vehicle as the picture-scanning device, so as to obtain complete data of the target object, and further, re-construction of the three-dimensional model can be performed based on data (such as point cloud data, picture data, etc.) obtained by scanning.

Step 2, acquiring a candidate three-dimensional model obtained by performing at least one of incomplete-part completion or color restoration based on the initial three-dimensional model.

It should be noted that, since the target object may be age-old and may be damaged by some substances in natural environment, it may cause incomplete part of the target object, faded color of the target object, and the like, in order to restore original appearance and color of the target object as much as possible, incomplete-part completion and/or color restoration may be performed based on the initial three-dimensional model.

In a possible implementation, a historical cultural relic specialist may be invited to provide guiding suggestions, so that a person skilled in the art may perform incomplete-part completion and/or color restoration on the initial three-dimensional model according to guidance of historical cultural relic specialist, so that a computer device (or the head-mounted device) can obtain a candidate three-dimensional model obtained through incomplete-part completion and/or color restoration.

Step 3, extracting a feature matrix of the candidate three-dimensional model in different viewing angles.

Optionally, an angle of the obtained candidate three-dimensional model may be adjusted to obtain pictures of the candidate three-dimensional model in different viewing angles, and then feature matrices of the candidate three-dimensional model in different viewing angles are determined based on the pictures of the candidate three-dimensional model in different viewing angles.

It should be noted that, for the process of determining the feature matrix of the candidate three-dimensional model in different angles based on the pictures of the candidate three-dimensional model in different angles, reference may be made to the process of determining the target feature matrix of the target object based on the picture including the target object in step 202, as long as a manner of determining the feature matrix is same as a manner of determining the target feature matrix, so that a subsequent process of matching based on the feature matrix can be well performed.

Step 4, storing the candidate three-dimensional model and the extracted feature matrix in the target database.

In a possible implementation, the candidate three-dimensional model and the corresponding feature matrix may be stored in the target database in association, so that the corresponding three-dimensional model can be subsequently determined based on the feature matrix.

The above process is described by taking that only one candidate three-dimensional model and the corresponding feature matrix are obtained as an example, and a process of obtaining other candidate three-dimensional models and corresponding feature matrices is similar thereto, and details will not be repeated here.

Figure 3:
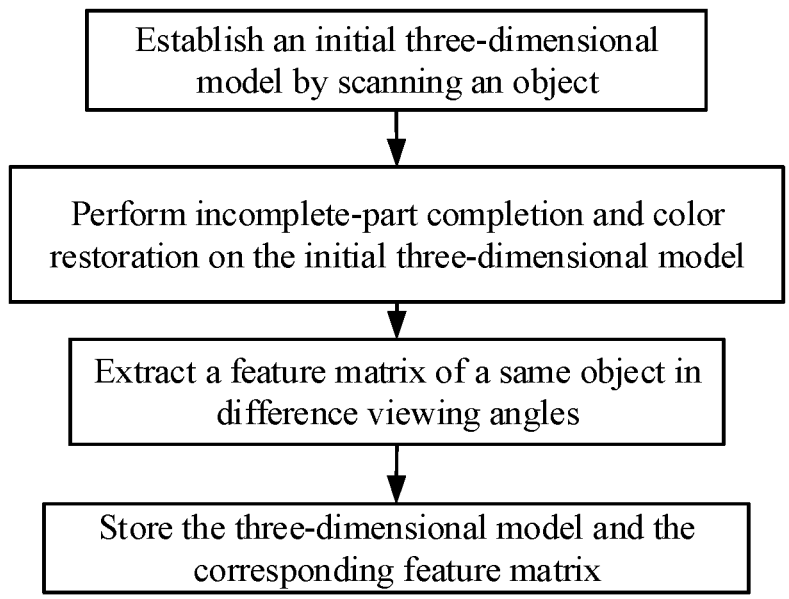
FIG. 3 is a schematic diagram illustrating a process of constructing a target database according to an embodiment of the present disclosure.

The above process of constructing the target database can be referred from FIG. 3, FIG. 3 is a schematic diagram of a process of constructing a target database according to an embodiment of the present disclosure. As shown in FIG. 3, an initial three-dimensional model of an object may be established by scanning the object, and incomplete-part completion and color restoration are performed on the initial three-dimensional model to obtain a candidate three-dimensional model, so as to extract feature matrices of the candidate three-dimensional model in different angles, and obtain feature matrices of a same object in different angles, and then the candidate three-dimensional model and the corresponding feature matrix are correspondingly stored to implement the construction of the target database.

The construction of the target database can be completed through the above process, so that after the target feature matrix is determined in step 202, the feature matrix can be matched through step 203 to implement obtaining of the target three-dimensional model.

In some embodiments, for step 203, acquiring the target three-dimensional model matched with the target object from the target database based on the target feature matrix of the target object may include:

step 2031, matching the target feature matrix with the feature matrix stored in the target database.

In a possible implementation, the target feature matrix may be compared with the feature matrices stored in the target database one by one, to implement matching between the target feature matrix and the feature matrices stored in the target database.

After determining that one feature matrix in the target database is same as the target feature matrix, it may be determined that this feature matrix matches with the target feature matrix.

Step 2032, determining a candidate three-dimensional model corresponding to the feature matrix matched with the target feature matrix as the target three-dimensional model.

It should be noted that, in the target database, one candidate three-dimensional model may correspond to a plurality of feature matrices, and after the feature matrix matched with the target feature matrix is determined through step 2031, the candidate three-dimensional model corresponding to the feature matrix may be determined, so as to determine the candidate three-dimensional model corresponding to the feature matrix as the target three-dimensional model, and to obtain the target three-dimensional model from the target database.

After the target three-dimensional model is obtained through step 203, the target three-dimensional model can be displayed through step 204, so that the user can see the displayed target three-dimensional model, and the target three-dimensional model is performed with incomplete-part completion and/or color restoration, so that the original appearance and color of the target object can be better restored, and the user experience can be improved.

It should be noted that, the target database may further store media data corresponding to each candidate three-dimensional model, and the media data may be used to describe the candidate three-dimensional model in a form of video or audio, for example, describe a construction time, a construction history, and the like of the candidate three-dimensional model, that is, describe a construction time and a construction history of the target object, so that the user can better understand the target object through the media data.

The media data may be pre-recorded and stored in the target database, and the media data and the corresponding candidate three-dimensional model may be stored in association, so that after the target three-dimensional model is determined in step 203, the media data corresponding to the target three-dimensional model can be directly determined.

In some embodiments, after the target three-dimensional model is displayed in step 204, first prompt information may be further displayed, so as to query whether to play the media data corresponding to the target three-dimensional model through the first prompt information, the user only needs to respond the first prompt information, and the head-mounted device may determine whether the media data corresponding to the target three-dimensional model needs to be played.

For example, the first head-mounted device may display a first feedback control and a second feedback control, the user may trigger first feedback information by triggering the first feedback control, the first feedback information may be used to indicate that the media data corresponding to the target three-dimensional model needs to be played, so that the first head-mounted device may determine, based on the received first feedback information, that the media data corresponding to the target three-dimensional model needs to be played; or the user may trigger second feedback information by triggering the second feedback control, and the second feedback information may be used to indicate that the media data corresponding to the target three-dimensional model does not need to be played, so that the first head-mounted device may determine, based on the received second feedback information, that the media data corresponding to the target three-dimensional model does not need to be played.

In a possible implementation, in response to receiving the first feedback information based on the first prompt information, the first head-mounted device may acquire the media data corresponding to the target three-dimensional model from the target database, and then play the obtained media data, so that the user may learn the target object through the played media data.

Figure 4:
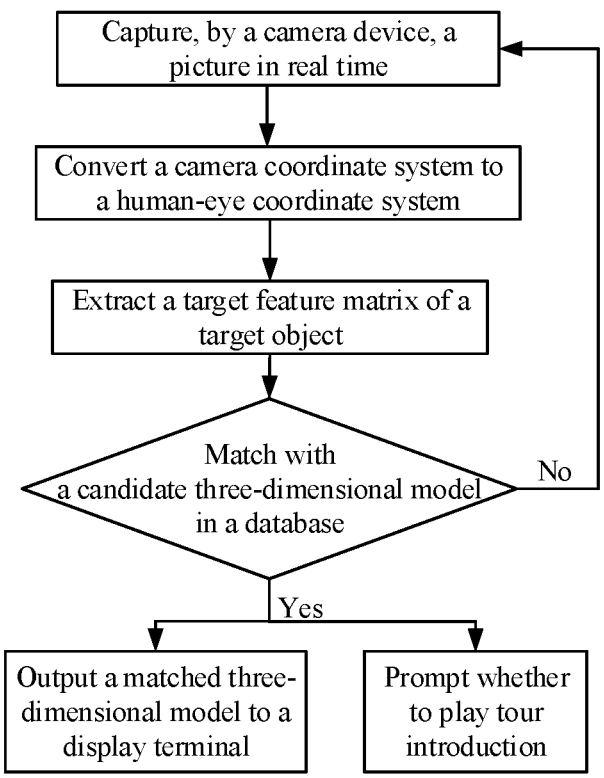
FIG. 4 is a flowchart of a picture display method according to an embodiment of the present disclosure.

Processes of the picture display method provided by the above embodiments can be referred from FIG. 4, FIG. 4 is a flowchart of a picture display method according to an embodiment of the present disclosure. As shown in FIG. 4, a camera device of a first head-mounted device may capture a picture in real time, the first head-mounted device may convert the captured picture from a camera coordinate system to a human-eye coordinate system, so as to extract a target feature matrix of a target object based on the picture in the human-eye coordinate system, so as to match a candidate three-dimensional model in a database based on the target feature matrix, and output a matched three-dimensional model to a display terminal when the candidate three-dimensional model is matched from the database, and may also prompt whether to play media data corresponding to the matched three-dimensional model, that is, tour introduction; and in addition, in a case that no candidate three-dimensional model is matched from the database, the camera device can continue to capture pictures in real time.

The above process mainly describes a process of acquiring the target three-dimensional model and displaying the target three-dimensional model, optionally, the user may also adjust the picture of the displayed target three-dimensional model according to the use's own needs.

In some embodiments, the user can perform picture adjusting operations through the first head-mounted device, so that in response to a picture-adjusting operation on the first head-mounted device, the first head-mounted device can adjust a picture of the displayed target three-dimensional model according to at least one of a display viewing angle or a picture zooming factor indicated by the picture-adjusting operation.

In the following, a process of adjusting the picture according to the display viewing angle indicated by the picture-adjusting operation and a process of adjusting the picture according to the picture zooming factor indicated by the picture adjustment operation will be described respectively.

In a possible implementation, the user can trigger the picture-adjusting operation at a first preset position on the first head-mounted device, so that in response to the picture-adjusting operation at the first preset position on the first head-mounted device, the first head-mounted device can display a picture of the target three-dimensional model at a display viewing angle indicated by the picture-adjusting operation according to the display viewing angle indicated by the picture-adjusting operation.

The first preset position may be located at an area with a touch function on a left temple of the first head-mounted device, the user may perform a sliding operation in the area with the touch function on the left temple to trigger the picture-adjusting operation.

Optionally, different sliding directions may correspond to different adjusting ways of the display viewing angle, for example, when sliding along a direction toward a tail of the temple in the area with the touch function on the left temple, the displayed picture may be adjusted to a picture seen at a position higher than an actual height of the user, so as to implement adjusting of the display viewing angle. Correspondingly, when sliding along a direction opposite to a tail of the temple in the area with the touch function on the left temple, the displayed picture may be adjusted to a picture seen at a position lower than an actual height of the user, so as to implement adjusting of the display viewing angle.

In general situations, pictures are seen by a human standing on the ground, however, for huge statues, effects seen at different heights are different. For example, for a huge Buddha statue, a proportion of each part of the Buddha statue is very coordinated in the picture viewed from the ground, however, since a picture seen by human eyes has a foreshortening effects, a head of the Buddha statue is actually larger than a body part closer to the human eyes, through the above adjusting process of the display viewing angle, the tourists can feel magnificence at different viewing angles, and personally feel wisdom of ancient people in carving the Buddha statue.

In a possible implementation, the user can trigger the picture-adjusting operation at a second preset position on the first head-mounted device, so that in response to the picture-adjusting operation at the second preset position on the first head-mounted device, the first head-mounted device can zoom in or zoon out the picture of the displayed target three-dimensional model according to the picture zooming factor indicated by the picture-adjusting operation.

The second preset position may be located at an area with a touch function on a right temple of the first head-mounted device, the user may perform a sliding operation in the area with the touch function on the right temple to trigger the picture-adjusting operation.

Optionally, different sliding directions may correspond to different adjusting ways of the picture zooming factor, for example, when sliding along a direction toward a tail of the temple in the area with the touch function on the right temple, the displayed picture may be zoomed in, so as to implement zooming in or zooming out of the picture. Correspondingly, when sliding along a direction opposite to a tail of the temple in the area with the touch function on the right temple, the displayed picture may be zoomed out.

Since most of the statues are very large, the tourist is still far away from the statue even when standing at the most front place available for viewing, and details cannot be seen clearly. Through the above process, the picture can be zoomed in or zoomed out according to the tourist's own needs, thereby improving viewing experience of the user.

In addition, in order to ensure a better viewing experience, the picture is preferably not to be zoomed in ceaselessly, because ceaselessly zooming in may result in picture distortion and blurring.

Therefore, in some embodiments, in response to the picture-adjusting operation at the second preset position on the first head-mounted device, when the picture zooming factor indicated by the picture-adjusting operation reaches a set zooming factor, second prompt information can be displayed, where the second prompt information is used to indicate that the picture zooming factor indicated by the picture-adjusting operation reaches the set zooming factor. Optionally, the second prompt information may be voice prompt information, text prompt information, etc., and a specific type of the second prompt information is not limited in the present disclosure.

The set zooming factor may be pre. When a person observes a certain object, a distance from eyes to the object is generally fixed, at this time, an observation effect on the object is good, and therefore, the set zooming factor can be set to have equivalent effect as this distance, so as to make the observer feel watching the object at a close distance, thereby improving user experience.

Figure 5:
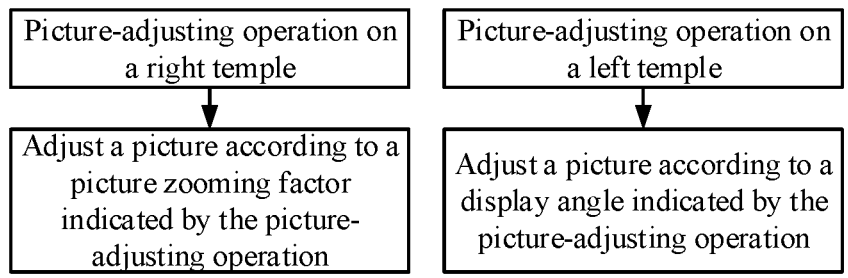
FIG. 5 is a schematic diagram of a picture adjusting manner according to an embodiment of the present disclosure.

Referring to FIG. 5, FIG. 5 is a schematic diagram of a picture adjusting manner according to an embodiment of the present disclosure, as shown in FIG. 5, a user may trigger a picture-adjusting operation on a right temple, so that the first head-mounted device may adjust a picture according to a picture zooming factor indicated by the picture-adjusting operation; in addition, the user may further trigger a picture-adjusting operation on a left temple, so that the first head-mounted device may adjust the picture according to a display viewing angle indicated by the picture-adjusting operation.

Figure 6:
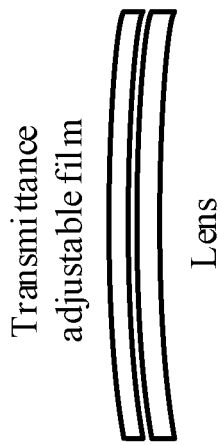
FIG. 6 is a schematic diagram of a setting manner of a transmittance adjustable film according to an embodiment of the present disclosure.

The above process is only a process of adjusting the picture, optionally, lens of the head-mounted device may also be provided with a transmittance adjustable film, and opacity of the transmittance adjustable film may be adjusted to provide a better viewing effect for the user. For example, referring to FIG. 6, FIG. 6 is a schematic diagram of a setting manner of a transmittance adjustable film according to an embodiment of the present disclosure. As shown in FIG. 6, the transmittance adjustable film can be set on a surface of lenses.

The transmittance adjustable film may be a film made by Polymer Dispersed Liquid Crystal (PDLC), and opacity of the film may be controlled by controlling magnitude of voltage.

Optionally, in response to the picture-adjusting operation on the first head-mounted device, the transmittance adjustable film of the first head-mounted device may be set to an opaque state.

By setting the transmittance adjustable film to the opaque state, the user can only see a screen picture, so as to avoid that the screen picture does not overlap with an actual picture caused by picture-adjusting operation which will influence viewing experience of the user, thereby improving immersiveness of user viewing.

Alternatively, in response to the picture-adjusting operation on the first head-mounted device, ambient light brightness is acquired, and transparency level of the transmittance adjustable film of the first head-mounted device is adjusted based on the ambient light brightness.

Different ambient light brightness may correspond to different transparency levels of the transmittance adjustable film, and a correspondence may be preset, so that after the head-mounted device acquires the ambient light brightness, the head-mounted device may directly determine, according to the preset correspondence, a level to which the transparency of the transmittance adjustable film needs to be adjusted, so as to adjust the transparency of the transmittance adjustable film.

By adjusting the transparency level of the transmittance adjustable film according to a value of the ambient light brightness, watching of user is ensured not to be influenced by a situation that the actual picture viewed by human eyes does not overlap with the screen picture, so as to avoid discomfort of human eyes caused by sudden dimming of lens brightness.

Figure 7:
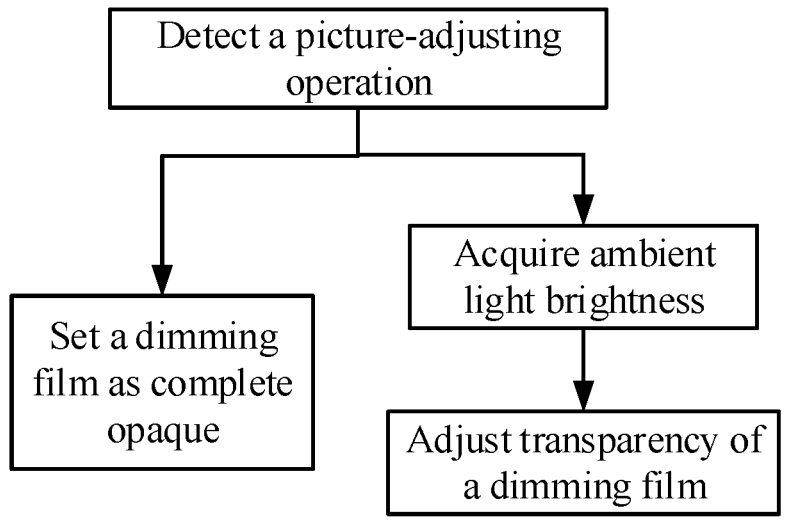
FIG. 7 is a schematic diagram of a transparency-adjusting process of a transmittance adjustable film according to an embodiment of the present disclosure.

Referring to FIG. 7, FIG. 7 is a schematic diagram of an transparency-adjusting process of a transmittance adjustable film according to an embodiment of the present disclosure. As shown in FIG. 7, in a case of detecting a picture-adjusting operation, the transmittance adjustable film may be directly set to an opaque state (i.e., completely opaque). The ambient light brightness may also be acquired, and then the transparency level of the transmittance adjustable film may be adjusted according to the ambient light.

It should be noted that, in a tour process, there is often a case that parents take their child for touring, however, since heights of the parents and the child are different, pictures seen by the parents and the child are different, in order for the child to see the picture seen by the parents, the parents can synchronize their picture to the child, so that the child can see a view angle of an adult.

In some embodiments, when the first head-mounted device is paired with a second head-mounted device, the first head-mounted device may send a picture displayed on the first head-mounted device to the second head-mounted device, where the first head-mounted device may be a head-mounted device used by the parents, and the second head-mounted device may be a head-mounted device used by the child.

When pairing the first head-mounted device and the second head-mounted device, pairing of the first head-mounted device and the second head-mounted device may be implemented in a Bluetooth pairing manner, and a picture of the first head-mounted device may be subsequently transmitted to the second head-mounted device in a Bluetooth transmission manner, to implement picture synchronization of the first head-mounted device and the second head-mounted device. Optionally, picture synchronization of the first head-mounted device and the second head-mounted device may also be implemented in a wireless (Wireless Fidelity, WiFi) transmission manner, which is not limited in the present disclosure.

In addition, in the tour process, there is often a case that the child is out of parents' sight and is lost, and therefore, the parent may sometimes need to obtain real-time location information of the child, so that the parent can find the child in time.

In some embodiments, when the first head-mounted device is paired with a second head-mounted device, in response to a location-acquiring operation on the first head-mounted device, the first head-mounted device can acquire location information of the second head-mounted device, so that the first head-mounted device can display the acquired location information.

The first head-mounted device may provide a location-acquiring control, and the user may trigger a location-acquiring operation by triggering the location-acquiring control, so that the first head-mounted device may acquire the location information of the second head-mounted device in response to the location-acquiring operation.

It should be noted that the head-mounted device may be provided with a global positioning system (GPS), so that the second head-mounted device can acquire the location information of the second head-mounted device its own, so as to send the obtained location information to the first head-mounted device, and the first head-mounted device can acquire the location information of the second head-mounted device.

Optionally, the first head-mounted device may further display a first route map based on the location of the first head-mounted device and the location of the second head-mounted device, where the first route map is used to indicate a route from a location where the first head-mounted device is located to a location where the second head-mounted device is located, so that the parents may quickly arrive at a location where the child is located based on the indication of the first route map.

Figure 8:
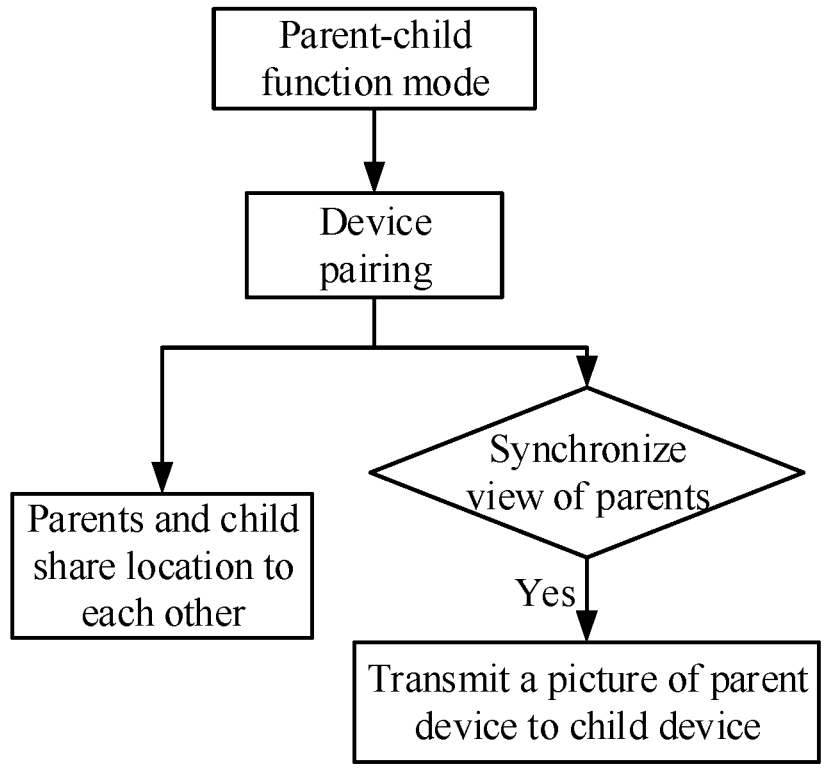
FIG. 8 is a processing flowchart of a head-mounted device in a parent-child function mode according to an embodiment of the present disclosure.

Referring to FIG. 8, FIG. 8 is a processing flowchart of a head-mounted device in a parent-child function mode according to an embodiment of the present disclosure. As shown in FIG. 8, in the parent-child function mode, a first head-mounted device used by parents and a second head-mounted device used by a child may be paired, so that the parents and the child may share a location of each other, so that the parent may learn the location of the child at any time; in addition, a picture of the first head-mounted device may be transmitted to the second head-mounted device in a case where there is a need to synchronize a view of the parents, so as to transmit the picture of the parents' device to the child's device.

In addition, in the tour process, there is often a case that a tour guide take tourists for touring, in addition, in the tour process, the tour guide can introduce and describe for the tourists from time to time, when the tour guide is introducing, the tour guide can point to or look to a view that is introduced, at this time, the tourist cannot clearly know what the tour guide specifically refers to and where to look at, and at this moment, the tour guide can synchronize the picture of the tour guide to the tourists, so that the tourists can clearly know the scenic spot described by the tour guide, thereby improving tour experience.

In some embodiments, when the first head-mounted device is paired with a second head-mounted device, the first head-mounted device may send a picture displayed on the first head-mounted device to the second head-mounted device, where the first head-mounted device may be a head-mounted device used by the tour guide, and the second head-mounted device may be a head-mounted device used by the tourists.

In a possible implementation, the first head-mounted device may maintain a device identifier list, where the device identifier list may be used to store a device identifier of a second head-mounted device used by a tourist guided by the tour guide, that is, pairing of the first head-mounted device and the second head-mounted device is implemented, and subsequently, the first head-mounted device may transmit the picture to the second head-mounted device included in the device identifier list.

Optionally, picture synchronization of the first head-mounted device and the second head-mounted device may be implemented through Bluetooth transmission, WiFi transmission, etc., which is not limited in the present disclosure.

In addition, in the process that the tour guide takes tourists for touring, when visiting of a scenic spot is finished, there is often a period of free time before meeting again. In this case, the tour guide may set meeting information (including a meeting time and a meeting location) through the first head-mounted device, so that the tourists can be reminded to meet in time when the meeting time is reached.

In a possible implementation, when the first head-mounted device is paired with a second head-mounted device, in response to reaching the meeting time, the first head-mounted device can send the meeting information to the second head-mounted device, where the second head-mounted device is used to display a second route map when receiving the meeting information, where the second route map may be used to indicate a route from a location of the second head-mounted device to the meeting location.

By displaying the second route map when the meeting information is received, the tourists can quickly reach the meeting location according to a navigation route.

Figure 9:
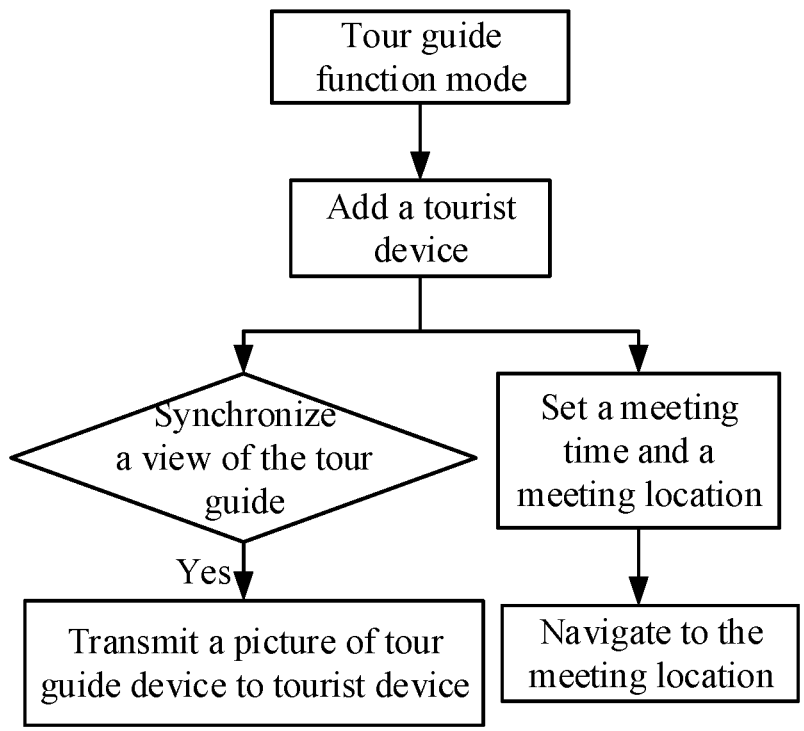
FIG. 9 is a processing flowchart of a head-mounted device in a tour-guide function mode according to an embodiment of the present disclosure.

As shown in FIG. 9, FIG. 9 is a processing flowchart of a head-mounted device in a tour-guide function mode according to an embodiment of the present disclosure. As shown in FIG. 9, a second head-mounted device (a tourist device) can be added in a first head-mounted device, so that when there is a need to synchronize a view of the tour guide, a picture of the first head-mounted device can be transmitted to the second head-mounted device, so as to implement transmission of the tour guide picture to the tourist device; in addition, the tour guide can also set a meeting time and a meeting location through the first head-mounted device, so that the tourists can navigate to the meeting location through the second head-mounted device when the meeting time is reached.

Figure 10:
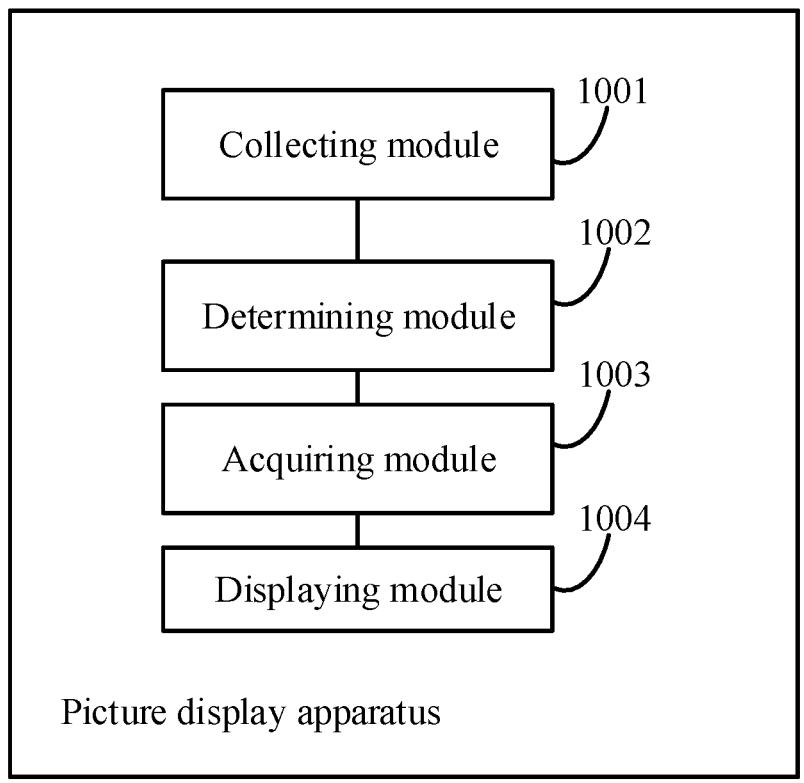
FIG. 10 is a block diagram of a picture display apparatus according to an embodiment of the present disclosure.

An embodiment of the present disclosure further provides a picture display apparatus, as shown in FIG. 10, FIG. 10 is a block diagram of a picture display apparatus according to an embodiment of the present disclosure, where the apparatus is applied to a first head-mounted device, and includes:
- a collecting module 1001, configured to collect a picture including a target object;
- a determining module 1002, configured to determine a target feature matrix of the target object based on the picture including the target object;
- an acquiring module 1003, configured to acquire a target three-dimensional model matched with the target object from a target database based on the target feature matrix of the target object, where the target database is used to store at least one candidate three-dimensional model and a feature matrix corresponding to each of the at least one candidate three-dimensional model, and each of the at least one candidate three-dimensional model is obtained by performing at least one of incomplete-part completion or color restoration based on an initial three-dimensional model obtained by scanning using a picture-scanning device; and
- a display module 1004, configured to display the target three-dimensional model.

In some embodiments, when acquiring the target three-dimensional model matched with the target object from the target database based on the target feature matrix of the target object, the acquiring module 1003 is configured to:
- match the target feature matrix with the feature matrix stored in the target database; and
- determine a candidate three-dimensional model corresponding to the feature matrix matched with the target feature matrix as the target three-dimensional model.

In some embodiments, a process of constructing the target database includes:
- acquiring the initial three-dimensional model obtained by scanning using the picture-scanning device;
- acquiring a candidate three-dimensional model obtained by performing at least one of incomplete-part completion or color restoration based on the initial three-dimensional model;
- extracting a feature matrix of the candidate three-dimensional model in different viewing angles; and
- storing the candidate three-dimensional model and the extracted feature matrix in the target database.

In some embodiments, the target database is further configured to store media data corresponding to the at least one candidate three-dimensional model, and the media data is used to introduce the candidate three-dimensional model in a form of video or audio;
- the displaying module 1004 is further configured to display first prompt information, where the first prompt information is used to query whether to play media data corresponding to the target three-dimensional model.

In some embodiments, the acquiring module 1003 is further configured to: in response to receiving first feedback information based on the first prompt information, acquire the media data corresponding to the target three-dimensional model from the target database, where the first feedback information is used to indicate to play the media data corresponding to the target three-dimensional model; and
the apparatus further includes:
- a playing module, configured to play the acquired media data.

In some embodiments, the apparatus further includes:
an acquiring module, configured to: in response to a picture-adjusting operation on the first head-mounted device, adjust a picture of the displayed target three-dimensional model according to at least one of a display viewing angle or a picture zooming factor indicated by the picture-adjusting operation.

In some embodiments, when in response to the picture-adjusting operation on the first head-mounted device, adjusting the picture of the displayed target three-dimensional model according to at least one of the display viewing angle or the picture zooming factor indicated by the picture-adjusting operation, the adjusting module is configured to perform at least one of:
  in response to the picture-adjusting operation at a first preset position on the first head-mounted device, displaying a picture of the target three-dimensional model at a display viewing angle indicated by the picture-adjusting operation according to the display viewing angle indicated by the picture-adjusting operation; or
  in response to the picture-adjusting operation at a second preset position on the first head-mounted device, zooming in or zooming out the picture of the displayed target three-dimensional model according to the picture zooming factor indicated by the picture-adjusting operation.

In some embodiments, the displaying module 1004 is further configured to: in response to the picture-adjusting operation at the second preset position on the first head-mounted device, when the picture zooming factor indicated by the picture-adjusting operation reaches a set zooming factor, display second prompt information, where the second prompt information is used to indicate that the picture zooming factor indicated by the picture-adjusting operation reaches the set zooming factor.

In some embodiments, the adjusting module is further configured to: in response to the picture-adjusting operation on the first head-mounted device, set transmittance adjustable film of the first head-mounted device to an opaque state; or
  the adjusting module is further configured to: in response to the picture-adjusting operation on the first head-mounted device, acquire ambient light brightness, and adjust transparency level of the transmittance adjustable film of the first head-mounted device based on the ambient light brightness.

In some embodiments, the apparatus further includes:
a first sending module, configured to: when the first head-mounted device is paired with a second head-mounted device, send a displayed picture of the first head-mounted device to the second head-mounted device.

In some embodiments, the acquiring module 1003 is further configured to: when the first head-mounted device is paired with a second head-mounted device, in response to a position-acquiring operation on the first head-mounted device, acquire position information of the second head-mounted device; and
  the displaying module is further configured to display the acquired position information.

In some embodiments, the display module is further configured to display a first route map, where the first route map is used to indicate a route from a location of the first head-mounted device to a location of the second head-mounted device.

In some embodiments, the apparatus further includes:
a setting module, configured to set a meeting time and a meeting location through the first head-mounted device;
a second sending module, configured to: when the first head-mounted device is paired with a second head-mounted device, in response to reaching the meeting time, send meeting information to the second head-mounted device, where the second head-mounted device is used to display a second route map when receiving the meeting information, where the second route map is used to indicate a route from a location of the second head-mounted device to the meeting location.

In some embodiments, the target object is a grotto-statue-type historical relic.

Implementation processes of functions and effects of each module in the above apparatus can be referred from implementation processes of corresponding steps in the above method, and details will not be repeated herein.

For the apparatus embodiments, since they basically correspond to the method embodiments, reference may be made to the method embodiments. The apparatus embodiments described above are merely illustrative, where the modules described as separate components may or may not be physically separate, and the components displayed as modules may or may not be physical modules, that is, may be located in one place, or may be distributed to multiple network modules. Some or all of the modules may be selected according to actual needs to achieve the objectives of the solutions of the present specification. Those skilled in the art can understand and implement without making creative efforts.

Figure 11:
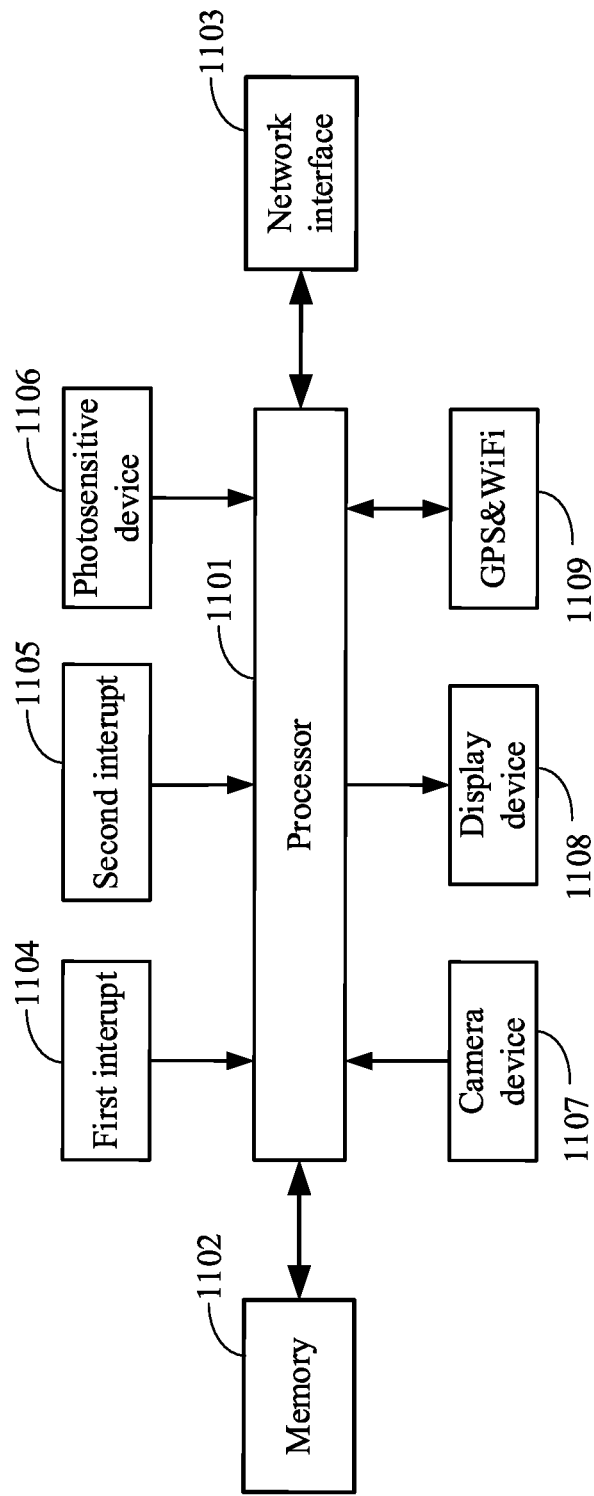
FIG. 11 is a schematic structural diagram of a head-mounted device according to an embodiment of the present disclosure.

The present disclosure further provides a head-mounted device. Referring to FIG. 11, FIG. 11 is a schematic structural diagram of a head-mounted device according to an embodiment of the present disclosure. As shown in FIG. 11, the head-mounted device includes a processor 1101, a memory 1102, a network interface 1103, a first interrupt 1104, a second interrupt 1105, a photosensitive device 1106, a camera device 1107, a display device 1108, a GPS and WiFi module 1109, where the memory 1102 is configured to store a computer program code executable on the processor 1101, and the processor 1101 is configured to, when executing the computer program code, implement the picture display method provided in any embodiment of the present disclosure, and the network interface 1103 is configured to implement an input/output function.

In addition, the first interrupt 1104 may be a right temple touch interrupt, and after receiving the first interrupt, the processor 1101 may determine a picture zooming factor; the second interrupt 1105 may be a left temple touch interrupt, and after receiving the second interrupt, the processor 1101 may determine a display viewing angle; the light photosensitive device 1106 may be configured to obtain ambient light brightness, the camera device 1107 may be configured to capture a real-time picture, and the display device 1108 may be configured to display a picture of the three-dimensional model; and for the GPS and Wi-Fi module 1109, a GPS may acquire a current location in real time and provide accurate positioning for navigation, and WiFi may ensure data transmission between the head-mounted devices.

In more possible implementations, the head-mounted device may further include other hardware, which is not limited in the present disclosure.

The present disclosure further provides a computer-readable storage medium, which may be in various forms, for example, in different examples, the computer-readable storage medium may be: a RAM (Radom Access Memory), a volatile memory, a non-volatile memory, a flash memory, a storage drive (for example, a hard disk drive), a solid state disk, any type of storage disk (for example, an optical disk or a DVD), or similar storage media, or a combination thereof. Especially, the computer-readable medium may also be paper or other suitable media capable of printing a program. The computer-readable storage medium stores a computer program, and when the computer program is executed by the processor, the picture display method provided by any embodiment of the present disclosure is implemented.

The present disclosure further provides a computer program product, including a computer program, where when the computer program is executed by a processor, the picture display method provided by any embodiment of the present disclosure is implemented.

In the present disclosure, the terms "first" and "second" are for descriptive purposes only and are not to be construed as indicating or implying relative importance. The term "plurality" refers to two or more, unless specifically defined otherwise.

Other embodiments of the present disclosure will be readily apparent to those skilled in the art upon consideration of the specification and practice of the disclosure disclosed herein. The present disclosure is intended to cover any of the variations, uses, or adaptations of the present disclosure, which follow the general principles of the present disclosure and include common or customary means in the art not disclosed. The specification and the embodiments are to be regarded as exemplary only, and the true scope and spirit of the present disclosure are indicated by the claims.

It should be understood that the present disclosure is not limited to the precise structure already described above and shown in the drawings, and that various modifications and changes may be made without departing from the scope thereof. The scope of the present disclosure is limited only by the appended claims.

The invention claimed is:

1. A picture display method, performed by a first head-mounted device, comprising:
    collecting a picture comprising a target object;
    determining a target feature matrix of the target object based on the picture comprising the target object;
    acquiring a target three-dimensional model matched with the target object from a target database based on the target feature matrix of the target object, wherein the target database is used to store at least one candidate three-dimensional model and a feature matrix corresponding to each of the at least one candidate three-dimensional model, and each of the at least one candidate three-dimensional model is obtained by performing at least one of incomplete-part completion or color restoration based on an initial three-dimensional model obtained by scanning using a picture-scanning device; and
    displaying the target three-dimensional model.

2. The method according to claim 1, wherein acquiring the target three-dimensional model matched with the target object from the target database based on the target feature matrix of the target object comprises:
    matching the target feature matrix with the feature matrix stored in the target database; and
    determining a candidate three-dimensional model corresponding to the feature matrix matched with the target feature matrix as the target three-dimensional model.

3. The method according to claim 1, wherein a process of constructing the target database comprises:
    acquiring the initial three-dimensional model obtained by scanning using the picture-scanning device;
    acquiring a candidate three-dimensional model obtained by performing at least one of incomplete-part completion or color restoration based on the initial three-dimensional model;
    extracting a feature matrix of the candidate three-dimensional model in different viewing angles; and
    storing the candidate three-dimensional model and the extracted feature matrix in the target database.

4. The method according to claim 1, wherein the target database is further configured to store media data corresponding to the at least one candidate three-dimensional model, and the media data is used to introduce the candidate three-dimensional model in a form of video or audio;
    after displaying the target three-dimensional model, the method further comprises:
    displaying first prompt information, wherein the first prompt information is used to query whether to play media data corresponding to the target three-dimensional model.

5. The method according to claim 4, wherein after displaying the first prompt information, the method further comprises:
    in response to receiving first feedback information based on the first prompt information, acquiring the media data corresponding to the target three-dimensional model from the target database, wherein the first feedback information is used to indicate to play the media data corresponding to the target three-dimensional model; and
    playing the acquired media data.

6. The method according to claim 1, wherein after displaying the target three-dimensional model, the method further comprises:
    in response to a picture-adjusting operation on the first head-mounted device, adjusting a picture of the displayed target three-dimensional model according to at least one of a display viewing angle or a picture zooming factor indicated by the picture-adjusting operation.

7. The method according to claim 6, wherein in response to the picture-adjusting operation on the first head-mounted device, adjusting the picture of the displayed target three-dimensional model according to at least one of the display viewing angle or the picture zooming factor indicated by the picture-adjusting operation comprises at least one of:
    in response to the picture-adjusting operation at a first preset position on the first head-mounted device, displaying a picture of the target three-dimensional model at a display viewing angle indicated by the picture-adjusting operation according to the display viewing angle indicated by the picture-adjusting operation; or
    in response to the picture-adjusting operation at a second preset position on the first head-mounted device, zooming in or zooming out the picture of the displayed target three-dimensional model according to the picture zooming factor indicated by the picture-adjusting operation.

8. The method according to claim 7, further comprising:
    in response to the picture-adjusting operation at the second preset position on the first head-mounted device, when the picture zooming factor indicated by the picture-adjusting operation reaches a set zooming factor, displaying second prompt information, wherein the second prompt information is used to indicate that the picture zooming factor indicated by the picture-adjusting operation reaches the set zooming factor.

9. The method according to claim 6, wherein the method further comprises:
in response to the picture-adjusting operation on the first head-mounted device, setting a transmittance adjustable film of the first head-mounted device to an opaque state; or
in response to the picture-adjusting operation on the first head-mounted device, acquiring ambient light brightness, and adjusting transparency level of the transmittance adjustable film of the first head-mounted device based on the ambient light brightness.

10. The method according to claim 1, wherein the method further comprises:
when the first head-mounted device is paired with a second head-mounted device, sending a displayed picture of the first head-mounted device to the second head-mounted device.

11. The method according to claim 1, wherein the method further comprises:
when the first head-mounted device is paired with a second head-mounted device, in response to a location-acquiring operation on the first head-mounted device, acquiring location information of the second head-mounted device; and
displaying the acquired location information.

12. The method according to claim 11, wherein the method further comprises:
displaying a first route map, wherein the first route map is used to indicate a route from a location of the first head-mounted device to a location of the second head-mounted device.

13. The method according to claim 1, wherein the method further comprises:
setting a meeting time and a meeting location through the first head-mounted device;
the method further comprises:
when the first head-mounted device is paired with a second head-mounted device, in response to reaching the meeting time, sending meeting information to the second head-mounted device, wherein the second head-mounted device is used to display a second route map when receiving the meeting information, wherein the second route map is used to indicate a route from a location of the second head-mounted device to the meeting location.

14. The method according to claim 1, wherein the target object is a grotto-statue-type historical relic.

15. A non-transitory computer-readable storage medium, wherein the computer-readable storage medium stores a program, and when the program is executed by a processor, operations performed in the picture display method according to claim 1 is implemented.

16. A picture display apparatus, applied to a first head-mounted device, comprising:
a memory, a processor and a computer program stored on the memory and executable by the processor, wherein when the computer program is executed by the processor, the processor is configured to:
collect a picture comprising a target object;
determine a target feature matrix of the target object based on the picture comprising the target object;
acquire a target three-dimensional model matched with the target object from a target database based on the target feature matrix of the target object, wherein the target database is used to store at least one candidate three-dimensional model and a feature matrix corresponding to each of the at least one candidate three-dimensional model, and each of the at least one candidate three-dimensional model is obtained by performing at least one of incomplete-part completion or color restoration based on an initial three-dimensional model obtained by scanning using a picture-scanning device; and
display the target three-dimensional model.

* * * * *